(No Model.)
J. P. LUMMUS.
SEED PLANTER AND FERTILIZER DISTRIBUTER.
No. 314,187. Patented Mar. 17, 1885.
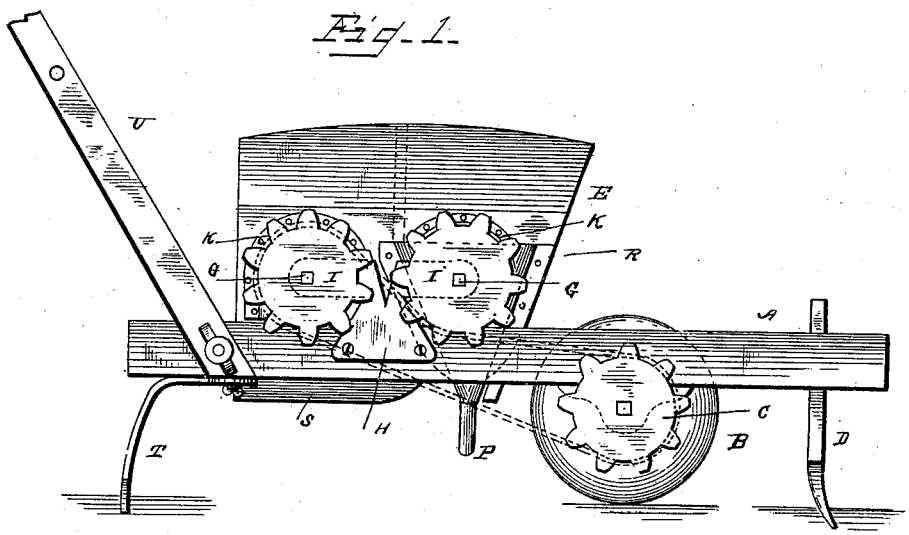
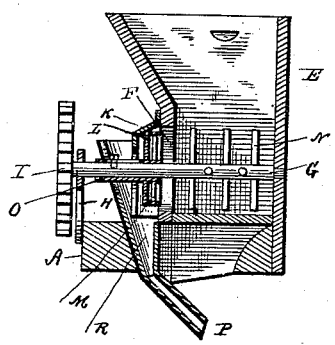
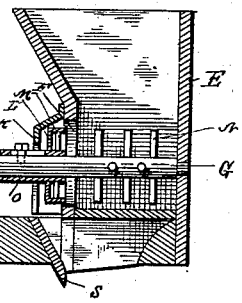
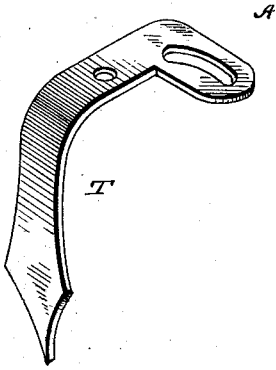
WITNESSES
Chas. D. Davis
J. J. McCarthy
INVENTOR
Jno. P. Lummus
Attorney

UNITED STATES PATENT OFFICE.

JOHN P. LUMMUS, OF JACKSON, GEORGIA.

SEED-PLANTER AND FERTILIZER-DISTRIBUTER.

SPECIFICATION forming part of Letters Patent No. 314,187, dated March 17, 1885.

Application filed July 9, 1884. (No model.)

*To all whom it may concern:*

Be it known that I, JOHN P. LUMMUS, a citizen of the United States, residing at Jackson, in the county of Butts and State of Georgia, have invented certain new and useful Improvements in Seed-Planters and Fertilizer-Distributers, of which the following is a specification, reference being had therein to the accompanying drawings.

My invention relates to certain improvements in seeders and fertilizer-distributers, and is designed to effectually and properly drop the seed and the fertilizer and then cover the same, the two being kept in separate receptacles. The device is applicable for planting large or small seed.

In describing the device, reference will be had to the annexed drawings, in which—

Figure 1 represents a side elevation of the device; Fig. 2, a section through one of the partitions of the hopper—the seed holder; Fig. 3, a similar section through the other partition—the fertilizer-holder; Fig. 4, a detail view of one of the coverers.

A designates the frame of the device supporting the several parts, and near the forward end of which is journaled a wheel, B, carrying on one end of its shaft a sprocket-wheel, C. The wheel B is preceded by an adjustable opener, D.

To the rear of the wheel a hopper, E, is secured to the frame. This hopper is provided with a central division extending across it, so as to provide a seed-holder in front and a fertilizer to the rear, preventing them mixing.

On one side of each of the divisions of the hopper is an opening, F. Extending centrally through these openings are shafts G, journaled at one end in the other side of the said hopper, and at the other end in a frame or bearing, H, secured to the frame A. Projecting beyond the bearing H each shaft has on it a sprocket-wheel, I, similar to the one C.

On the outside of the hopper, and surrounding each of the openings F, is a casing, K, having a central passage for the shaft, and an opening at the bottom for the escape of the seed.

Within the casing, but outside the hopper, is a cylinder or wheel, L, having its outer end closed, and being provided with radial arms M, which serve to strengthen it and act also as stirrers, the portion of the shaft within the hopper being provided also with stirrers N.

Each of the wheels L is provided with a slotted sleeve, O, embracing the shaft, by means of which the said wheel is adjusted nearer to or farther from the opening F, thereby regulating the flow of material from the hopper, the sleeve being held by a set-screw passing into the shaft through the slot before mentioned.

The flow of the seed from the front division of the hopper is directed under the center of the machine by means of a spout, P, extending downward from a funnel, R, inclosing the lower part of the front casing, K.

The rear division of the hopper containing the fertilizer is not provided with a funnel, but discharges on an inclined piece, S, on the frame A, thus distributing the said fertilizer over more or less space, as is necessary for the proper nourishment of the seed.

The seed and fertilizer having been deposited they are buried by the covers T, which have at their upper ends a right-angle L-extension. The covers are secured to each side of the frame by a pivotal screw or bolt. The L-extension is slotted, so that by means of a set-screw the points of the covers may be adjusted at an angle to the plane of the motion of the machine, thus covering the seed with more or less earth, according as the covers are adjusted farther or nearer one to the other.

For convenience in manipulating the device, handles U are provided, and are secured to the frame preferably by a bolt having a thumb-screw at one end, as shown. The motive power is communicated from the drive-wheel by a belt or chain to the sprocket-wheels, thus operating the device.

If desired, pulleys or gear may be used in place of the sprocket-wheels.

Having described the device, what I claim is—

1. In a seed-planter, the combination, with a hopper having a side opening, of an outwardly-projecting casing open at the bottom and covering said opening, a shaft extending across said hopper, and a revolving cylinder secured to the shaft, said cylinder having its outward end closed, provided with stirrers within itself, said stirrers supporting and bracing the walls of the cylinder, which is adjustable longitudinally on the shaft and located within the casing coincident with the opening in the hopper, substantially as and for the purpose specified.

2. In a seed-planter, a flow-adjustment for the seed, consisting of a cylinder having one end closed, a sleeve passing centrally through said cylinder and beyond its closed end where it is longitudinally slotted, and stirrers extending radially from the sleeve interiorly to the walls of the said cylinder, the entire device being adjustably fixed on the operating-shaft of the planter exterior to the hopper and coincident with its seed-orifice, substantially as and for the purpose specified.

3. In a seed-planter, a divided hopper with side discharge-openings, shafts journaled in the hopper and to bearings on the frame and provided with stirrers, adjustable flow-regulators, each consisting of a wheel or cylinder having one end closed and provided with bracing stirrers, the said wheels being secured to the shaft by a set-screw passing through a slotted sleeve, a funnel and spout under one of the discharge-openings, and an inclined board under the other, and the coverers each pivoted to the frame and adjustable by means of a right-angle slotted L-extension, as and for the purpose set forth.

In testimony whereof I affix my signature in presence of two witnesses.

JOHN P. LUMMUS.

Witnesses:
JOSHUA C. ZUBER,
JAMES F. CARMICHAEL.